Feb. 2, 1932.    G. A. BURNHAM    1,843,105
HIGH TENSION OUTDOOR SWITCHING SYSTEM AND APPARATUS
Filed March 12, 1928    4 Sheets-Sheet 4
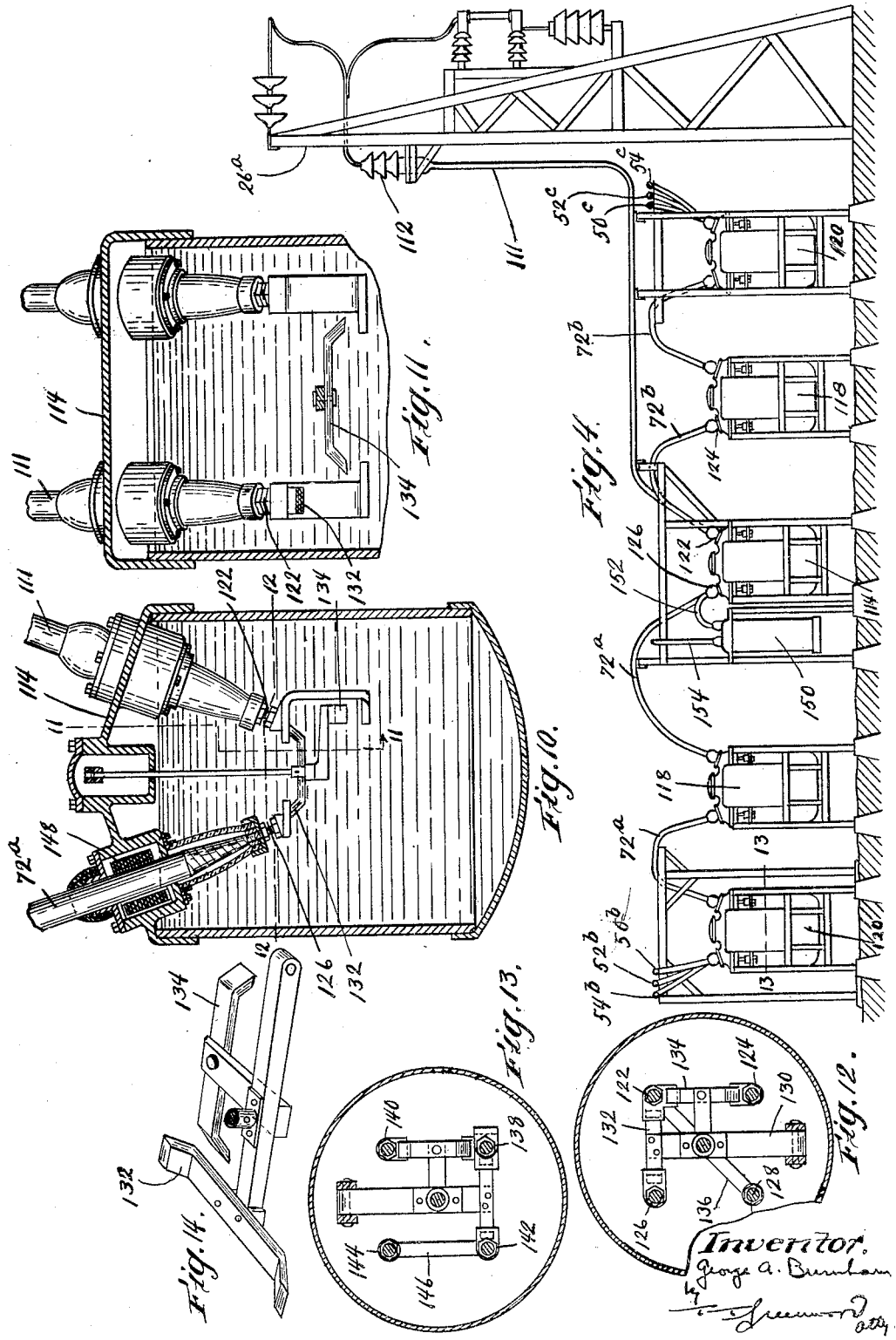

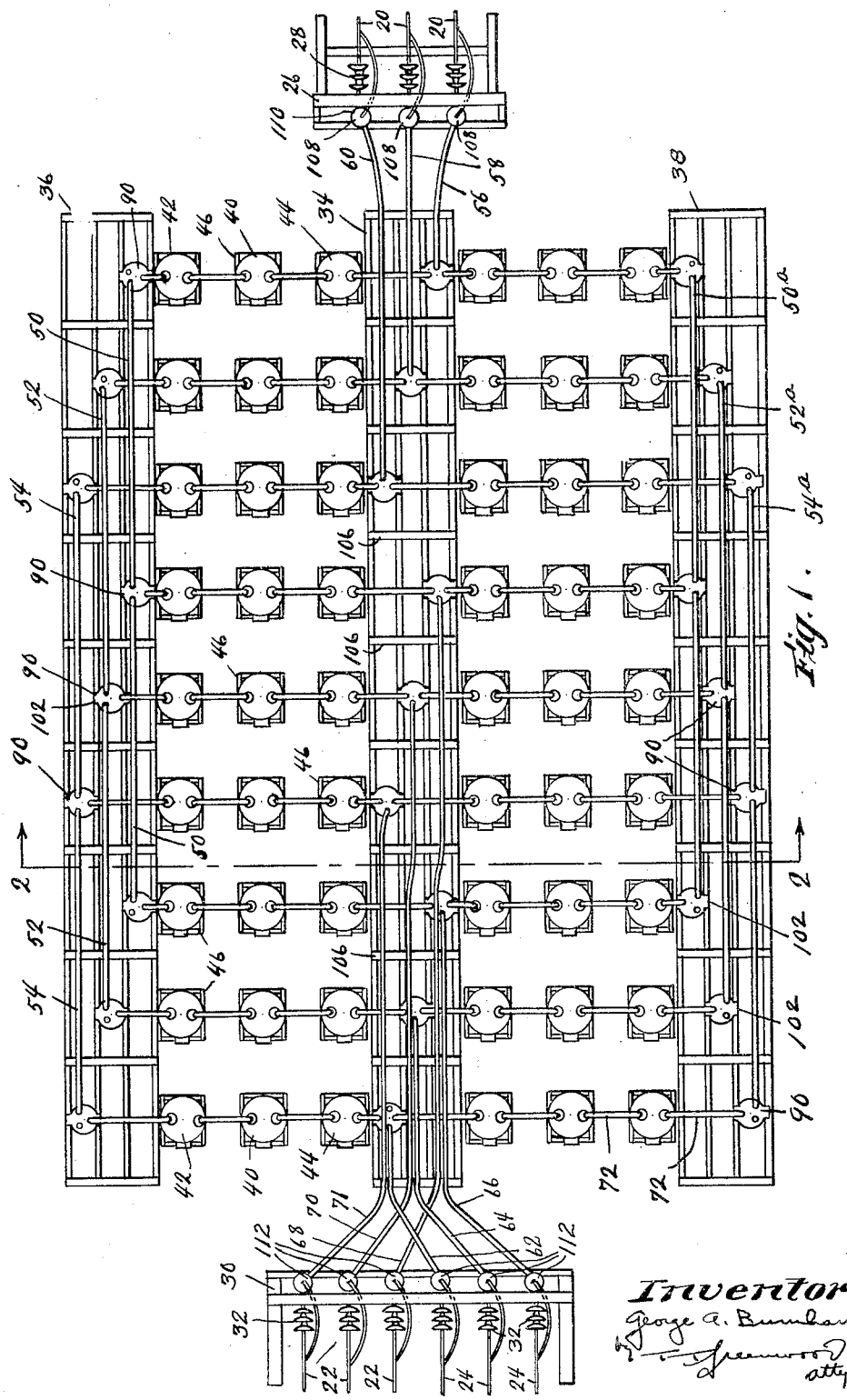

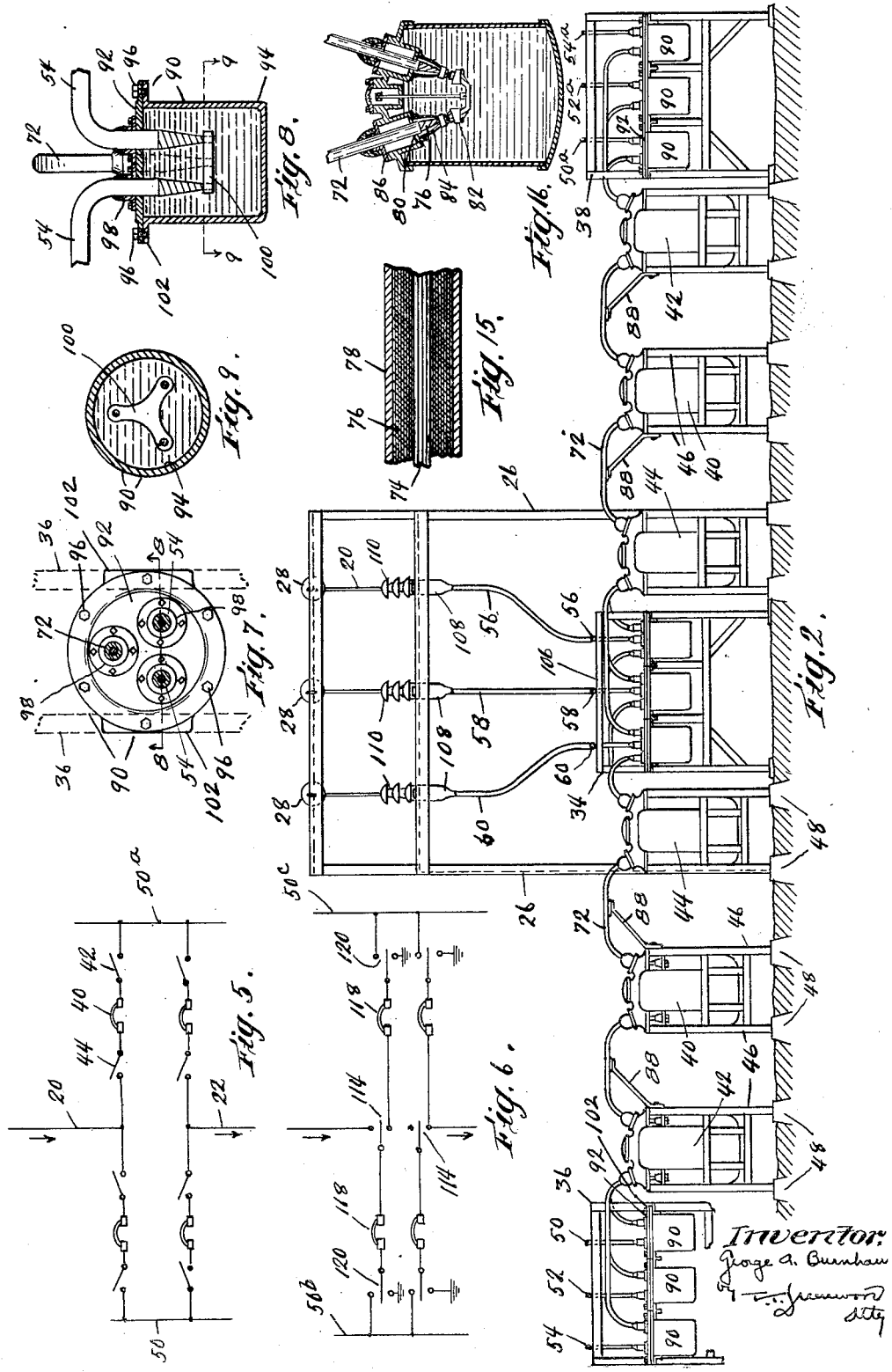

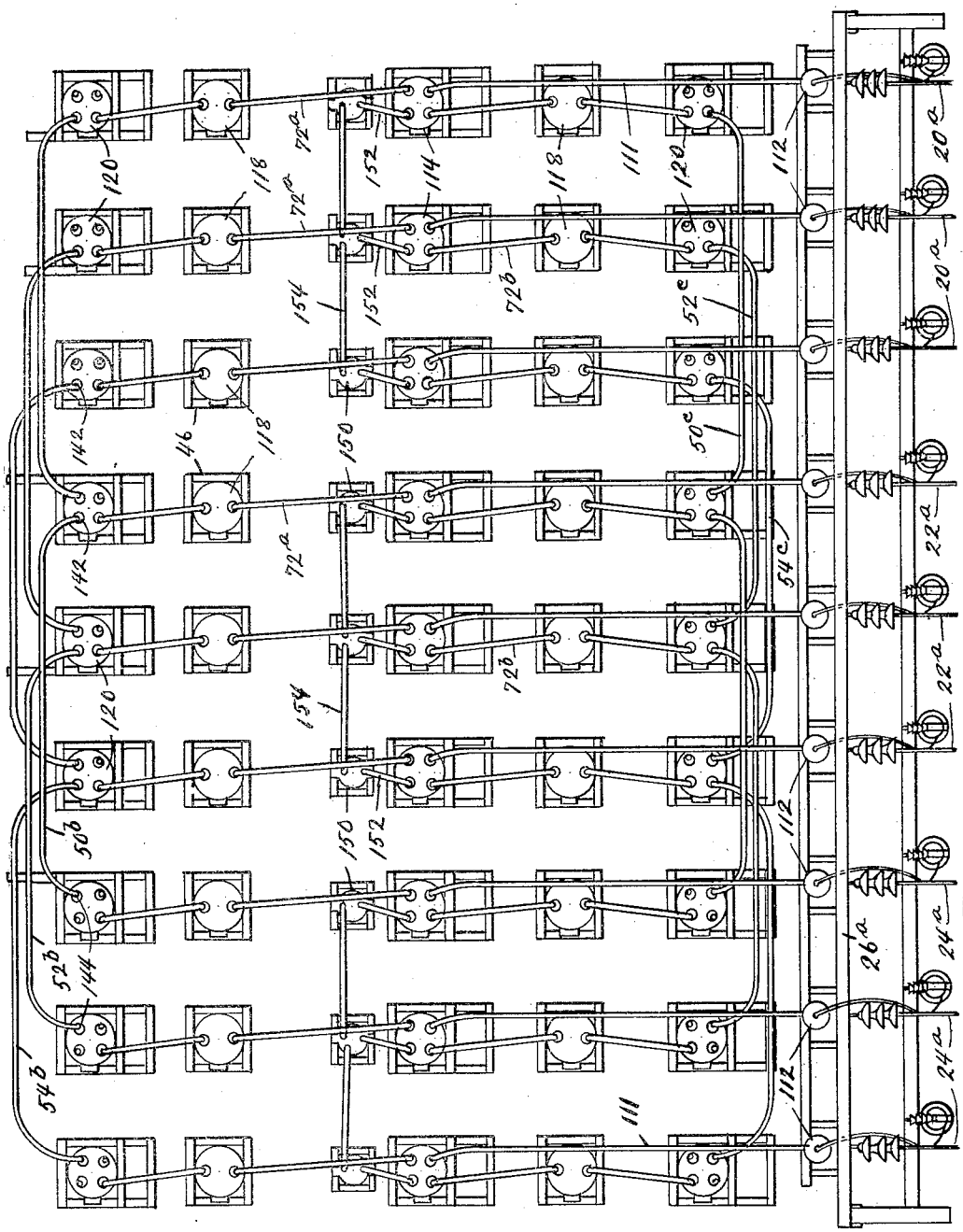

Patented Feb. 2, 1932

1,843,105

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

HIGH TENSION OUTDOOR SWITCHING SYSTEM AND APPARATUS

Application filed March 12, 1928. Serial No. 260,841.

This invention relates to high tension outdoor switching installations wherein an incoming high tension line is subdivided into a plurality of outgoing high tension distribution lines, and wherein switching apparatus is installed to obtain proper control of the incoming line and the outgoing lines and to provide for continuity of service when it becomes necessary to inspect, overhaul or make changes to some of the switching apparatus.

The usual outdoor switching installations, if of any size at all, are expensive and elaborate. The bare high tension conductors connecting the pieces of switching apparatus have to be supported by expensive high tension insulators and must be spaced widely apart and at a relatively great height above the apparatus for safety reasons and to prevent flash over between conductors that are at different potentials. The supporting of the conductors and the insulators and other associated parts of such an installation requires elaborate structural steel frames which rise high in the air above the switches and other casing enclosed electrical apparatus and must be carefully designed and installed to provide adequate support for the high tension conductors carried by them and to prevent accidental flash over between the conductors and the frames. These frames and the multitude of insulators required for the interconnecting high tension conductors are expensive to construct and install and are also expensive in upkeep. The frame work must be periodically painted and the workmen are forced to work either in the dangerous vicinity of the charged high tension conductors, or a part of the installation must be shut down. Under some conditions of service, it is almost impossible to find a period of time when a part of the installation can be shut down and rendered free from high potential without seriously inconveniencing the customers for the power controlled by such an installation. Consequently, it is most often the case that workmen are constrained to work upon the structure when the conductors are at high tension, thus jeopardizing the safety of the workmen and slowing up their rate of working because of the care they should exercise in keeping clear of the dangerous zone of the high tension conductors.

Such an installation requires a large amount of high tension insulators to support the intercommunicating high tension conductors. These insulators must be periodically inspected and defective insulators must be removed.

The high and extensive frame work invites direct lightning strokes and precautions must be taken to prevent damage by lightning to the frame work and also to the high tension lines of the apparatus associated therewith. Because of the height of the frame work and the horizontal extent thereof high tension lines radiating from such an installation must be subject to atmospheric electrical disturbances to a greater degree than other and similar lines which are not associated with such an installation.

Because of the necessity for wide spacing between the intercommunicating high tension conductors and between such conductors and the supporting frame and the necessity for employing long insulators for supporting the high tension conductors from the frame work, apparatus must be spread out or the pieces separated so that the frame work covers a considerable extent of land which further increases the cost of said installation if the land happens to be at all valuable.

An object of the present invention is an outdoor high tension switching installation which is free from the above enumerated objections and which in particular has no exposed high tension interconnecting conductors and thereby avoids the necessity for the employment of high and elaborate supporting frames and expensive insulators so that the cost of the installation embodying this invention is greatly reduced over the usual installation and the cost of upkeep and maintenance is correspondingly reduced. The installation embodying this invention is also absolutely safe because there are no exposed high tension conductors extended between the various pieces of the apparatus of the installation.

In carrying out the invention, I provide switching apparatus arranged as is more or less the usual practice and interconnect the pieces of apparatus with each other and with the incoming and outgoing high tension lines through metallic sheathed high tension insulated flexible cables which lie immediately above pieces of switching apparatus and are supported on, or draped over, any suitable frame and extend directly into the casings of the switching apparatus and are terminated beneath the oil levels therein so that the high tension conductors are entirely enclosed and the expensive high tension insulating bushings of the switching apparatus are rendered unnecessary. Furthermore, the parts of the installation including the sheaths of the high tension conductors are at ground potential so that there is no possibility for a workman to come in contact with the live part of the system. Such an arrangement also constitutes an object of the present invention.

In an installation of the type here under consideration, the incoming high tension line is connected through switching apparatus to a high tension bus, to which the outgoing distribution lines are connected. It is customary to provide two sets of buses with switching apparatus so arranged that any line, either an incoming line or an outgoing line, can be connected with either bus thus to permit the power to be removed from certain of the buses and the apparatus associated therewith for the purpose of inspection, repairs, or changes, without interrupting the continuity of service on the outgoing distribution lines.

In accordance with this invention, high tension metallic sheathed insulated cables are used for the main and auxiliary buses and also for the interconnecting conductors between the buses and the pieces of switching apparatus; and this constitutes a further object of the invention.

It is another object of this invention to connect the interconnecting cables with the bus cables by separating the bus cables into sections the proximate ends of which are extended into insulating oil pots and are connected only under the oil therein; and extending the interconnecting bus cables also into said pots and connecting them therein to the connection between the bus sections. This arrangement provides an exceedingly convenient and satisfactory means for establishing connections between the bus cables and the interconnecting cables while preserving the effective continuity of the buses and the insulation of all the cables at the connections therebetween.

A further object of the invention is generally to improve the construction of outdoor high tension switching installations and methods and apparatus accessory thereto.

Fig. 1 is a plan view of a high tension outdoor switching system embodying the present invention.

Fig. 2 is a sectional view taken along line 2—2 of Fig. 1.

Fig. 3 is a plan view of a modified arrangement of high tension switching installation embodying the invention, wherein some of the functions of the separate pieces of apparatus in Figs. 1 and 2 are combined in one piece of aparatus in this showing.

Fig. 4 is an end elevation of the installation of Fig. 3.

Fig. 5 is a diagrammatic showing of the principle of the circuit embodied in Figs. 1 and 2.

Fig. 6 is a diagrammatic showing of the principle of the circuit embodied in Figs. 3 and 4.

Fig. 7 is an enlarged plan view of one of the bus-connecting junction pots of Figs. 1 and 2.

Fig. 8 is a sectional elevation taken along line 8—8 of Fig. 7.

Fig. 9 is a section taken along line 9—9 of Fig. 8.

Fig. 10 is a section through one of the switches of Fig. 4.

Fig. 11 is a section taken along line 11—11 of Fig. 10.

Fig. 12 is a section through a circuit interrupting switch taken along line 12—12 of Fig. 10.

Fig. 13 is a view similar to Fig. 12 and taken through a disconnecting switch at one of the buses, along line 13—13 of Fig. 4.

Fig. 14 is a perspective view of the movable switch member for both the interrupting switch and the disconnecting switch.

Fig. 15 is a detail partly in section of a metallic sheathed high tension cable herein utilized for the buses and for the interconnecting conductors of the switch installations herein illustrated.

Fig. 16 is a sectional elevation through a single pole electric switch which is representative of all the switches used in the system of Figs. 1 and 2 and of the interrupting switches of Figs. 3 and 4.

In Figs. 1 and 2, a single three-phase high tension line comprising the elevated bare conductors 20 extends into the switching installation and two high tension outgoing distribution lines comprising the elevated bare conductors 22 and 24 extend out of the installation. The high tension incoming conductors are carried by a structural steel tower 26 at one end of the installation and are tied thereto through insulators 28. The outgoing conductors 22 and 24 are tied to a similar steel tower 30 through insulators 32. A small supporting steel frame 34, having a height about equal to the height of the oil immersed switches associated with the installation, is extended between the towers 26 and 30. Similar supporting frames 36 and 38 are located on opposite sides of said middle frame and are used to support the main and auxiliary high tension buses. The various switches are located between the aforesaid frame.

As shown in Figs. 1 and 2, the switching apparatus for each phase conductor includes a circuit breaker or interrupting switch 40 which is of any suitable enclosed and oil immersed type that is satisfactory for outdoor installations. Disconnecting switches 42 and 44 are located on opposite sides of and in line with the interrupting switch 40 and are connected in series therewith. The disconnecting switches in general can be identical with the interrupting switch 40 but can be made of lighter material since they are not intended to be opened under load. Their sole function, as is common with this class of work, is to open the circuit on opposite sides of the interrupting switch, after the interrupting switch has opened, and thereby isolate the interrupting switch from its circuit so that the interrupting switch can be inspected or have work performed upon it. All of the switches of the installation can be of similar construction, although some of the switches can have different electrical characteristics from the others, depending upon the service requirements of the line with which they are associated.

Each switch as here shown is supported upon an independent frame 46 which is supported on independent concrete foundations 48. The spacing between the switches is small and need be sufficient only to provide free working room around the switches and to permit a switch to be taken outside the installation when necessary. The switches are or can be identical on opposite sides of the central frame 34 and one set of switches on one side of the central frame is used as a standby and is adapted to be placed in service when the corresponding set of switches on the other side of the frame is withdrawn from service for any reason.

The lines of switches on one side of the central frame work 34 are connected to the bus conductors 50, 52 and 54 carried by the frame work 36 while the switches on the other side of the central frame work are connected to corresponding bus conductors 50a, 52a, 54a. The bus conductors 50, 52, 54 may comprise the main buses of the installation while the other buses 50a, 52a, 54a may comprise the auxiliary buses of the installation. The three right hand switches of the installation of Fig. 1 are also connected to the respective incoming high tension conductors through conductors 56, 58, and 60. The left hand three lines of switches are connected to the outgoing high tension lines 24 through conductors 62, 64, 66 while the intermediate lines of switches are connected to the other outgoing high tension conductors through conductors 68, 70 and 71. The system of electrical connection is illustrated in Fig. 5 and is the common arrangement used in the art.

The interconnecting high tension conductors 72 which connect the circuit interrupters 40 with the disconnecting switches on opposite sides thereof and which also connect the disconnecting switches with the main and auxiliary bus conductors and with the incoming and outgoing conductors, and said incoming and outgoing conductors and the bus conductors, are each composed of a section of flexible metallic sheathed insulated high tension cable in accordance with this invention. A section of the cable is illustrated in Fig. 15 and comprises a central conductor 74 which may be composed of a suitable number of conducting strands for flexibility. Insulation 76 which may be of oil impregnated paper is wound upon and surrounds and encloses the central conductor and is in turn enclosed within a lead sheath 78. Such a conductor is characterized by its high value of insulation, its freedom from break down due to failure of its insulation, its flexibility, and its cheapness when compared with an electrically equivalent installation using exposed conductors and supporting insulators and frames. The high tension cable here described is a common article of commerce and can be obtained to withstand practically all commercial high voltages.

Connection is made between the interconnecting cable 72 and the circuit interrupter and the disconnecting switches in the manner illustrated in Fig. 16. The cable is extended through a passage 80 in the top cover of the switch and down to a point below the level of oil in the switch; and the lead sheath is terminated under the oil. The paper insulation 76 of the cable is then removed to form a tapered end at the end of the cable, and to expose the end of the conductor 74 thereof. Said conductor is connected electrically with the terminal or contact member 82 of the switch, which member is carried at the lower end of a simple porcelain insulating shell 84 that is co-axial with the end of the cable and is carried by the casing of the switch. The lead sheath of the cable is passed through and has a wiped joint with a cover plate 86 which is bolted removably to the switch casing around the cable passage therein and forms both a water tight joint between the cable and the switch casing and a ground connection between the lead sheath and the casing.

All of the switches including the frames 34, 36 and 38 are adapted to be grounded so that the lead sheaths of all the cables are also grounded. The cable is flexible so that it can bend to enter the switches as shown in Fig. 2 and the end of the cable can be removed from the switch by detaching the conductor 82 and by unbolting the cover plate 86 so that the switch can be removed and replaced without destroying the cable. The cables can be supported intermediate their lengths and between the various switches by upstanding brackets 88, see Fig. 2, which are carried by suitable frames 46. Connections between the cables 72 of the lines of switches with the main and auxiliary bus cables and with the incoming and outgoing metal sheathed cables are made in a similar manner through connecting or junction pots 90 as shown best in Figs. 1, 7 and 9. Where connection is to be made between a pair of cables the connection is made within the junction pots shown in the above figures. The pot comprises a casing comprising a cover 92 and an oil receptacle 94 which is secured removably by bolts 96 and can be lowered from the aforesaid relation to expose the terminals of the cables therein. The junction pots here shown have provision for the entrance of three cable ends and to this end three equi-angularly disposed openings are provided in the cover 92. The ends of the bus cable as, for instance, the adjacent sections of the main bus cable 54 are extended through these openings as shown in Fig. 8 and the lead sheaths of the cables are secured by wiped joints to the cover plates 98. The lead sheaths are terminated beneath the oil and the insulation is removed from the end of each cable to form a tapered insulating end and to expose the lower end of the conductor in the manner described in connection with Fig. 16. The interconnecting cable 72 is led into the junction pot and the inner end thereof is formed in a similar manner. The exposed ends of the conductors of the cable sections 54 are connected together and also to the conductor of the cable 72 by means of a triangular connecting plate 100, best shown in Fig. 9. This method of making connection between the various cables provides a connection which is easily made, is free from failure, necessitates no inspection or maintenance; and the cables can be disconnected and removed without trouble when changes are made to the system.

The junction pots at the ends of the main and auxiliary bus cables have but two cables extended thereinto and connected therein and the third opening in the cover of the junction pot can be blanked off.

The covers of the junction pot are provided with the laterally outstanding ears 102 by which the pots are supported on the frames 34, 36, and 38. The incoming high tension conductors 56, 58, and 60 are connected to the interconnecting cables in a similar manner through similar junction pots; and the same is the case with the outgoing conductors. The incoming high tension conductors 56, 58 and 60 are also composed of flexible metallic sheathed insulating cables which are supported on elevated cross bars 106 of the frame 34 above the cables 72 and extend longitudinally of said frame. The cables are extended upwardly along the high tension tower 26 and terminate in elevated pot heads 108 carried by said tower in the manner shown in Figs. 8 and 16 and are connected to the high tension conductors 20 which extend into the pot heads through insulating bushings 110 thereof. The outgoing cables 62, 64, 66 and 68, 70 and 71 are also extended longitudinally of the central frame 34 and are supported on other cross bars 106 thereof and are connected to their respective high tension outgoing lines through similar pot heads 112.

Since the lead sheaths of the cables are grounded, the various cables can be run close together or even lie one upon the other without harm. Consequently by the use of these cables the necessity for the elaborate frame work required to space the exposed high tension conductors widely apart, and the insulators for supporting the conductors in such position, is entirely eliminated.

The installation embodying the present invention therefore needs and has no elaborate supporting structure for its conductors and thus is much cheaper to install and maintain than the heretofore common structure. Since the lead sheaths of the cables are grounded, the installation is absolutely safe and workmen may handle the cables without danger from shock. Since there are no exposed conductors the spacing of the apparatus of the installation can be greatly reduced thus resulting in a great saving of expense.

Preferably, the level of oil in the junction pots and the switches is approximately the same height so that creepage of oil through the cables is prevented, although this is not particularly necessary with the present day commercial cables.

The installation shown in Figs. 3 and 4 is similar to the one above described so far as the electrical characteristics go although the arrangement is somewhat different. In this modification, both the connecting conductors 20a and the two sets of outgoing conductors 22a and 24a are carried on one high tension tower 26a.

High tension metal sheathed cables 111 are connected through pot heads 112 with said conductors and extend downwardly and horizontally over the switches and each is connected with a central switch 114 which has provision for four teminals and performs the double function of a disconnecting switch for each of the main and auxiliary circuit interrupters associated therewith and also of a double throw switch to connect the conductor 111 respectively with the switches associated with both the main and auxiliary buses. Each of said switches is connected with a two terminal, or single pole, switch 118 on opposite sides thereof, which switches are adapted to carry the load of interrupting the circuit and may be constructed as illustrated in Fig. 16. The switches 118 on opposite sides of the switch 114 are each connected with a separate four terminal switch 120 which latter switches are respectively connected with the main and auxiliary buses. Said switches 114 and 120 are constructed as illustrated in Figs. 10 through 14. The switch 114 has four terminals 122, 124, 126, 128 respectively of which the terminals 122, 124, and 126 are provided with contact members. The movable switch member includes an arm 130 which is pivotally supported at one end and carries an upstanding bridging member or brush 132 at the free end thereof and a similar but inverted brush 134 at one side thereof. The arrangement is such that when the arm 130 is raised, the brush member 132 connects the terminals 122 and 126 and when said arm is lowered, the brush member 134 connects the terminals 122 and 124. Thus, the switch functions as a double throw switch. In the mid position of the arm 130 the terminals are free from connection and the switch thus functions as a disconnecting switch. The terminal 128 is connected to the terminal 122 by a conducting strap 136. The incoming cable 111 is led into the switch casing and is connected to the terminal 122. The cable 72a is connected to the terminal 126 and extends to the left hand interrupting switch 118 of Fig. 4. The cable 72b is connected with the terminal 124 and is connected to the right hand interrupting switch. Thus, by proper operation of the switch 114, the cable 111 can be connected with either of the interrupting switches 118 and through these switches to the main and auxiliary buses.

The cables 111 and 72a and 72b are extended into the switch casing in the manner described in connection with the switch of Fig. 16. The disconnecting switches 120 are similar in construction to the switches 114 and are provided with terminals 138, 140, 142, 144. The cable 72a from the left hand switch 118 is connected to the terminal 138. The similar ends of each of the cable sections of the main bus cables 50b, 52b, 54b are adapted to be connected respectively to the terminal 142 and 144 and these terminals and, consequently, the bus sections are electrically connected under the oil by the bridging bar 146 so that the connection between the cable sections is accomplished in the manner illustrated in Fig. 8 except that in this instance the disconnecting switches 120 in themselves constitute the junction pots of the cables.

The right hand disconnecting switches 120 are similarly connected to their respective cables 72b and the bus cables 50c, 52c, 54c. The terminals 140 of the switches 120 are adapted to be grounded either by connecting the terminals directly with the switch casings or to a ground bus not herein shown.

Current transformers 148 can surround the cables of certain of the conductors in the various switches 114, see Fig. 10.

Potential transformers 150 are associated with the switches 114 and are connected through cables 152 with the terminals 124 of said switches. Similar high tension leads of the potential transformers can be connected together by the cables 154.

The construction and arrangement of the cables as above set forth and the connection of the cables inside the casings of the apparatus and the connection between the casings themselves is made as described in connection with the installation shown in Figs. 1 and 2.

The circuit diagram for the installation shown in Figs. 3 and 4 as illustrated in Fig. 6 is considered to be self-explanatory.

With this modified form of installation, the expensive structural steel frame work and the necessity for wide spacing of the conductors also is obviated and the same advantages are obtained as with the installation of Figs. 1 and 2.

The system shown in these modifications is further advantageous since it permits the economic employment of oil immersed disconnecting switches which are free from the troubles due to oxidation of contacts and accumulation of ice and snow that are present with the air brake disconnecting switches employed heretofore in the common outdoor switching installations. The manner of bringing the metallic sheathed cables into the electric switches and of providing insulation for the exposed ends thereof, and an insulator using this principle is disclosed in my copending application Serial No. 729,625, filed August 1, 1924; and an application of Joseph D. Wood Serial No. 745,994, filed October 27, 1924, and assigned to the assignee of this application.

I claim:

1. A high tension outdoor switching system including exposed high tension conductors, and a plurality of grouped casing-enclosed electric switches, said system characterized by the fact that the connections between the switches, and between the switches and the exposed high tension conductors, are made by flexible metallic-sheathed insulated cables, the sheaths of which cables are connected with the switch casings and the insulation and conductor of which are exposed only within the casings, the cables being free from exposed conductor and insulation.

2. A high tension outdoor switching system including elevated exposed high tension conductors, and a plurality of electric switches, and characterized by having the connections between the switches, and between the switches and the elevated high tension conductors composed of flexible metallic sheathed insulated cables which lie close to the switches and are connected to said high tension conductors at an elevated and inaccessible location, the sheaths of which cables are connected with the switch casings and the insulation and conductor of which are exposed only within the casings, the cables being free from exposed conductor and insulation.

3. A high tension outdoor switching system including exposed high tension conductors, and a plurality of casing-enclosed electric switches, and characterized by having the connection between the switches and between the switches and the exposed high tension conductors composed of flexible metallic-sheathed insulated cables which lie close to the switches and enter the casings of the switches and have their conductors exposed only within the casings, the metal sheaths of the cables being connected electrically with said casings.

4. A high tension switching system including incoming and outgoing lines, buses associated with said lines, casing-enclosed, oil-immersed circuit-connecting devices associated with said lines and buses and flexible metallic sheathed insulated cables extended between and having its ends extended into said casings and its conductors exposed and connected to said devices only under the oil of said casings.

5. A high tension switching system including incoming and outgoing lines, buses associated with said lines, casing-enclosed, oil-immersed circuit-connecting devices associated with said lines and buses and flexible metallic sheathed insulated cables extended between and having its ends extended into said casings and its conductors exposed and connected to said devices only under the oil of said casings, said casings containing oil to the same level.

6. A high tension outdoor switching system including exposed high tension conductors, a plurality of grouped electric switches, supporting frames associated with the switches, and flexible metallic sheathed electric cables interconnecting the switches and the high tension conductors and extended between the switches and supported by and lying in direct contact with said frames.

7. A high tension outdoor switching system including a high tower, elevated bare high tension lines carried by the tower, a plurality of electric switches located at the base of the tower, flexible metallic-sheathed insulated cables extended between and close to and connecting said switches, some of said cables being extended upwardly at said tower and terminated thereat and having connections with said bare high tension lines, and pot heads enclosing said connections and the elevated ends of said cables.

8. A high tension outdoor switching system including bare high tension conductors, bus-conductors, and electric switches connected to said high tension and bus-conductors, said system characterized by having the bus-conductors, and the connections between the switches and between the switches and high tension conductors composed of flexible metallic-sheathed insulated cables, the connections between the cables and the switches being effected only within the switch casings.

9. A high tension outdoor switching system including bare high tension conductors, bus-conductors, and electric switches connected to said high tension and bus-conductors, said system characterized by having the bus-conductors, and the connections between the switches and between the switches and high tension conductors composed of flexible metallic-sheathed insulated cables, the connections between the cables and the switches being effected only within an insulating medium.

10. A high tension outdoor switching system including exposed high tension conductors, oil-immersed electric switches, bus-conductors comprising sections of flexible metallic sheathed insulated cable having their proximate ends immersed in oil and their conductors connected under the oil, similar cables having ends immersed in the oil and their conductors connected with said cable conductors, said similar cables being connected with said switches and having their ends immersed in the oil of said switches and the conductors thereof exposed only under said oil, and other flexible metallic-sheathed cables also similarly connected with said switches and with said exposed high tension conductors.

11. In a high tension outdoor switching system, the combination with a plurality of switches of a bus-conductor associated with the switches comprising a sectional flexible metallic-sheathed insulated cable, and an oil-containing junction pot in which the proximate ends of the cable-sections are immersed, the cable-conductors being connected only beneath the oil, a switch having a connection with said bus-cables only under the oil in said pot.

12. In a high tension outdoor switching system, the combination of main and auxiliary buses constituting flexible metallic-sheathed insulated cables, switches associated with said buses, and connections between said buses and switches comprising similar cables having connections with said bus-cables only under oil.

13. In a high tension outdoor switching system the combination of main and auxiliary buses comprising flexible metallic-sheathed insulated cables, oil-immersed switches associated with said buses, and connections between said buses and switches only under the oil of said switches.

14. A high tension outdoor system including an incoming flexible metallic-sheathed insulated cable having an elevated pot-head in which one end thereof is terminated, an elevated exposed high tension conductor connected to said cable in said pot-head, two disconnecting switches and an interposed interrupting switch, said cable having its other end located within and connected with one of said disconnecting switches, similar cables terminated within said switches and connecting them in series, and a bus comprising a similar cable connected with said other disconnecting switch.

15. A high tension outdoor switching system including a high-tension tower having elevated pot-heads, elevated exposed high tension conductors carried by said tower extended into said pot heads, oil-immersed switches located at the base of said tower, flexible metallic-sheathed insulated cables having ends exposed only within said pot heads and connected with the high tension conductors therein, said cables being extended downwardly and horizontally along said switches and connected under insulating medium with certain of said switches, conductors connecting some of said switches comprising similar cables connected to said switches only under the oil thereof, supporting frames located at the ends of said switches, and similar cables resting directly on said frames and having connections with said switches only under an insulating medium.

16. A high tension outdoor switching system including a plurality of rows of series-connected oil-immersed switches, and a conductor connecting said rows together comprising flexible metallic-sheathed insulated cables extended between the rows and having their proximate ends extended under the oil of switches of the rows and the conductors of the cables exposed only under the oil, and connections between the exposed ends under the oil which connect said cables in series.

17. A high tension outdoor switching system including a plurality of rows of series-connected oil-immersed switches, and a bus conductor extended along the ends of the rows and in series into and out of the end switches of the rows and having connections with the other switches of the rows only under the oil of the end switches.

18. A high tension outdoor switching system including a plurality of rows of series-connected oil-immersed switches, and a bus conductor extended along the ends of the rows and into and out of the end switches of the rows and having connections with the other switches of the rows only under the oil of the end switches, said bus conductor comprising a sectional flexible metallic-sheathed insulated cable the adjacent sections of which have their proximate ends extended into the same switch and terminated under the oil therein and which have their conductors connected to each other and with the circuit through the other switches of the row under the oil.

19. A high tension outdoor switching system including incoming and outgoing circuit conductors, main, auxiliary and transfer buses, casing-enclosed switches for connecting said conductors and buses, and tie-conductors connecting said circuit conductors and buses, said tie-conductors and said buses being composed of flexible high tension lead-sheathed cables having their sheaths grounded and being free from exposed conductors and the insulation thereof.

20. A high tension outdoor switching system including incoming and outgoing lines, main and auxiliary buses associated with said lines, switches connecting said lines and buses, said buses being composed of flexible metallic-sheathed insulated high tension cables, and means connecting said lines and switches including oil-containing casings interposed in the bus-cables, said cables having their metallic sheaths connected with said casings and their insulation exposed only within said casings and their conductors exposed only under the oil in said casings, and tie-conductors extended into said casings and having connections with said conductors of said bus-cables only under the oil of said casings.

In testimony whereof, I have signed my name to this specification.

GEORGE A. BURNHAM.